US011496499B2

(12) United States Patent
Manickam et al.

(10) Patent No.: US 11,496,499 B2
(45) Date of Patent: Nov. 8, 2022

(54) PREVENTING SCHEDULING OR EXECUTING A RESOURCE ON AN INCONSISTENT HOST NODE

(71) Applicant: Hewlett Packard Enterprise Development LP, Houston, TX (US)

(72) Inventors: Siva Subramaniam Manickam, Bangalore Karnataka (IN); Vinnarasu Ganesan, Bangalore Karnataka (IN); Thavamaniraja Sakthivel, Bangalore Karnataka (IN); Balaji Ramamoorthi, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 73 days.

(21) Appl. No.: 17/302,017

(22) Filed: Apr. 21, 2021

(65) Prior Publication Data

US 2022/0103580 A1    Mar. 31, 2022

(30) Foreign Application Priority Data

Sep. 30, 2020    (IN) .............................. 202041042646

(51) Int. Cl.
| H04L 29/06 | (2006.01) |
| G06F 9/50 | (2006.01) |
| H04L 9/40 | (2022.01) |

(52) U.S. Cl.
CPC ........ *H04L 63/1425* (2013.01); *G06F 9/5005* (2013.01)

(58) Field of Classification Search
CPC ..... H04L 63/1425; H04L 43/00; H04L 43/20; H04L 43/0817; G06F 9/5005
See application file for complete search history.

(56) References Cited

U.S. PATENT DOCUMENTS

| 5,588,138 A | * | 12/1996 | Bai ....................... G06F 9/5016 |
| | | | 711/170 |
| 7,243,121 B2 | * | 7/2007 | Neiman ................ G06F 9/5038 |
| | | | 709/201 |
| 9,535,750 B1 | * | 1/2017 | Wilkes .................. G06F 9/5005 |
| 2014/0215486 A1 | * | 7/2014 | DeRosa ................ G06F 9/5088 |
| | | | 718/105 |

(Continued)

FOREIGN PATENT DOCUMENTS

| CN | 108777700 A | 11/2018 |
| CN | 109788046 A | 5/2019 |

OTHER PUBLICATIONS

Red Hat, Inc.; "Openshift Container Platform 4.3: Nodes"; Jun. 7, 2020; 205 pages.

(Continued)

*Primary Examiner* — Muhammad Raza
(74) *Attorney, Agent, or Firm* — Hewlett Packard Enterprise Patent Department

(57) ABSTRACT

Examples relate to preventing scheduling or executing a resource on an inconsistent host node in a networked system. Some examples track a taint status of the host node and identify whether the host node is inconsistent based on the taint status of the host node over a predefined period of time. Upon identifying that the host node is inconsistent, a master taint is applied on the inconsistent host node, which prevents scheduling or executing a resource on the identified inconsistent host node.

11 Claims, 5 Drawing Sheets

(56) References Cited

U.S. PATENT DOCUMENTS

2018/0341519 A1  11/2018  Vyas et al.
2020/0084088 A1   3/2020  Zhu et al.
2021/0073393 A1*  3/2021  Jacobson .............. G06F 21/602

OTHER PUBLICATIONS

The Kubernetes Authors; "Taint and Tolerations"; May 30, 2020; 10 pages; Retrieved from the Internet on Jun. 11, 2020 at URL: <kubenetes.io/docs/concepts/configuration/taint-and-toleration/>.

Ungureanu, Om, et al.; "Kubernetes Cluster Optimization Using Hybrid Shared-state Scheduling Framework"; Jul. 2019; 12 pages; ACM.

Zhong, C., et al.; "Intelligent Elastic Scheduling Algorithms for Paas Cloud Platform Based on Load Prediction"; May 2019; pp. 1500-1503; IEEE.

* cited by examiner

Table 1

| Host Nodes | Master Taint | Taint Status (Last 5 Hours) |
|---|---|---|
| Host Node 102-1 | Network Status=unreachable :NoSchedule, NoExecute | 1011111011111110101 0   M↓ |
| Host Node 102-2 | | 111101111111111111 |
| ... | | ... |
| Host Node 102-N | | 111111111111111111 |

202     204     206

Table 2

| Host Nodes | Master Taint | Taint Status (Last 7 Hours) |
|---|---|---|
| Host Node 102-1 | | 10111110111111101010⏞M⏞101011111 |
| Host Node 102-2 | | 111101111111111111111111111111 |
| ... | | ... |
| Host Node 102-N | | 111111111111111111111111111111 |

PREVENTING SCHEDULING OR EXECUTING A RESOURCE ON AN INCONSISTENT HOST NODE

BACKGROUND

Data may be stored on computing nodes, such as a server, a storage array, a cluster of servers, a computer appliance, a workstation, a storage system, a converged system, a hyper-converged system, or the like. The computing nodes (also referred to as host nodes) may host one or more resources that may generate or consume the data during their respective operations.

BRIEF DESCRIPTION OF THE DRAWINGS

These and other features, aspects, and advantages of the present specification will become better understood when the following detailed description is read with reference to the accompanying drawings, wherein:

FIG. 2 depicts tables that illustrate application and removal of a master taint on a host node, in accordance with an example;

DETAILED DESCRIPTION

Figure 1:
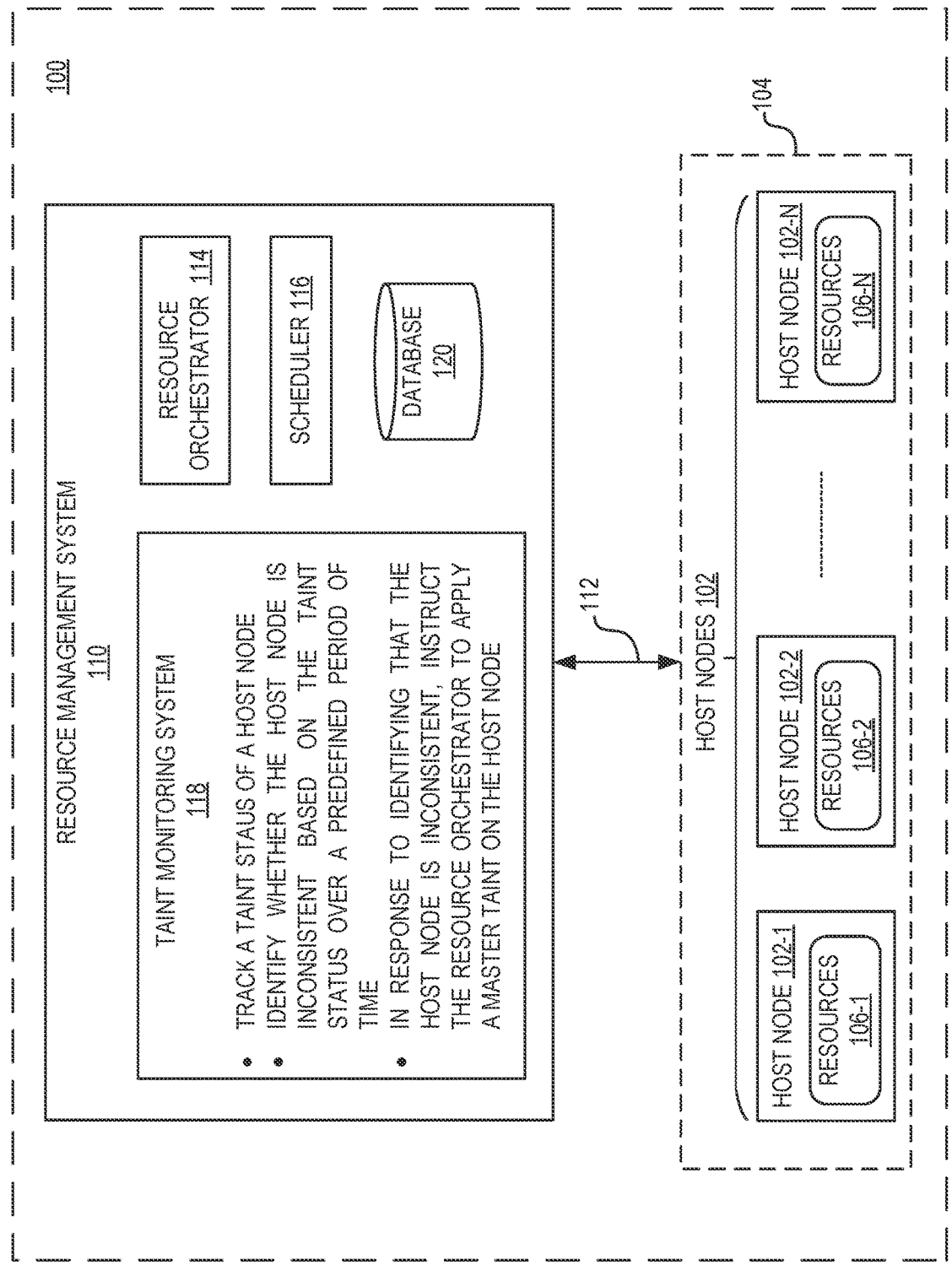
FIG. 1 is a block diagram of an example networked system including a plurality of host nodes, each hosting one or more resources, and a taint monitoring system for tracking taint status of the host nodes.

The following detailed description refers to the accompanying drawings. It is to be expressly understood, however, that the drawings are for the purpose of illustration and description only. While several examples are described in this document, modifications, adaptations, and other implementations are possible.

The terminology used herein is for the purpose of describing particular examples only and is not intended to be limiting. As used herein, the singular forms "a," "an," and "the" are intended to include the plural forms as well, unless the context clearly indicates otherwise. The term "coupled," as used herein, is defined as connected or associated, whether directly without any intervening elements or indirectly with at least one intervening element, unless otherwise indicated. Two elements can be connected mechanically, electrically, or communicatively linked through a communication channel, pathway, network, or system. The term "and/or" as used herein refers to and encompasses any and all possible combinations of the associated listed items. The term "based on" means based at least in part on. The term "another," as used herein, is defined as at least a second or more. It will also be understood that, although the terms first, second, third, etc. may be used herein to describe various elements, these elements should not be limited by these terms, as these terms are only used to distinguish one element from another unless stated otherwise or the context indicates otherwise.

As discussed, host nodes may host one or more resources that may execute various tasks. Examples of such resources may include, but are not limited to, a virtual machine, a container, a pod, a database, a data store, a logical disk, or a containerized application. Several such host nodes may be interconnected to form a networked system, for example. In some networked systems, a certain number of host nodes may be arranged in a cluster. Further, a networked system may include several such clusters of host nodes.

During operation, the resource(s) may be scheduled on their respective host nodes in a cluster to execute a set of instructions to complete a given computing task. As used herein, the term "scheduled" or "scheduling" may mean that a resource is implemented on a host node to execute a task (e.g., an application or a service).

Depending upon the performance, health, and operating status of a host node and/or certain defined rules, the host node may or may not be deemed serviceable for scheduling the resource(s) to perform a task. In order to be serviceable, each host node should fulfil a set of pre-conditions (such as a network connection state, power state, I/O threshold, etc.). In this regard, a taint may be applied on a host node if it does not deem serviceable (i.e., when it does not meet the set of pre-conditions to be serviceable). A taint may be an attribute that, when applied on a host node, may not allow scheduling or executing a resource on the host node.

In some instances, when a host node is tainted (i.e., when a taint is applied to the host node), the host node is made offline and unschedulable, and may be referred to as a "tainted host node." Unschedulable may mean that a resource cannot be scheduled on the host node, because the host node is not deemed serviceable for hosting the resource to perform a task. In such instances, any resource already hosted on the host node is evicted from the host node. In other instances, when the host node meets the set of the pre-conditions to be serviceable again and becomes serviceable, the taint is removed from the host node. Upon removing the taint, the host node is made online and schedulable, and may be referred to as a "non-tainted host node." Schedulable may mean that a resource can be scheduled on the host node, as the host node is deemed serviceable for hosting the resource to perform a task. In such instances, the resource is rescheduled (as the resource is scheduled again) on the host node.

In certain instances, a host node in a cluster may behave inconsistently, due to one or more issues (e.g., network connectivity issues such as inconsistent network bandwidth, power state issues or I/O threshold issues). For example, a host node may have intermittent network connectivity issue that makes the host node fluctuate from online to offline frequently. This inconsistent behavior of the node triggers a cycle of tainting and un-tainting the host node, which, in-turn, causes continuously rescheduling the resources on the host node. This may cause disruption to the application(s) or service(s) executed by the resource(s) on the host node and may affect the overall performance of the application(s) or service(s).

Examples described herein address these technological problems by identifying any host node in a networked system that behaves inconsistently by tracking a taint status of the host node. The taint status of the host node may be tainted or non-tainted. The tracking of the taint status of the host node may enable identifying whether the host node demonstrates an inconsistent behavior (i.e., whether the host node is inconsistent). Upon identifying that the host node is inconsistent, the examples described herein apply a master taint on the identified inconsistent host node. The master taint prevents scheduling or executing a resource on the identified inconsistent host node. Accordingly, the examples described herein, help in avoiding frequent or continuous rescheduling of resources on inconsistent host nodes and thereby may improve overall performance of the application(s) or service(s) executed on those host nodes.

Examples are further described herein with reference to FIGS. 1-6. It should be noted that the description and figures merely illustrate the principles of the present subject matter along with examples described herein, and should not be construed as limiting the present subject matter. Although some examples may be described herein with reference to a single host node, examples may be utilized for several host nodes in networked systems. Furthermore, any functionality described herein as performed by a component (e.g., a resource orchestrator, a taint monitoring system or a scheduler) of a networked system may be performed by at least one processor executing instructions (stored on a machine-readable storage medium) to perform the functionalities described herein. Various implementations of the present subject matter have been described below by referring to several examples.

FIG. 1 is a block diagram of an example networked system 100. The networked system 100 may include a plurality of host nodes 102-1, 102-2, . . . 102-N (collectively referred to as host nodes 102, hereinafter). In some examples, each host node 102 may be a device including a processor or microcontroller and/or any other electronic component, or a device or system that may facilitate various compute and/or data storage services. Examples of the host nodes 102 may include, but are not limited to, a desktop computer, a laptop, a smartphone, a server, a computer appliance, a workstation, a storage system, a converged or hyperconverged system, or the like.

In some examples, the host nodes 102 may be arranged in one or more clusters depending on various parameters including, but not limited to, geographic locations of the host nodes 102. For example, a number of host nodes that are located in a common geographical region may be arranged in one cluster. In the example of FIG. 1, the host nodes 102 are arranged in a cluster 104. As will be appreciated, there can be more than one clusters in the networked system 100 including a plurality of host nodes, in certain examples.

Each host node 102 may host one or more resources that may execute one or more applications or services, such as microservices. In the example of FIG. 1, the host node 102-1 is shown to host one or more resources 106-1, the host node 102-2 is shown to host one or more resources 106-2, and the host node 102-N is shown to host one or more resources 106-N. Each host node 102 may host any number of resources depending on its processing and/or storage capabilities. The resources 106-1, 106-2 and 106-N are, hereinafter, collectively referred to as the resources 106.

Examples of the resources 106 may include, but are not limited to, a virtual machine (VM), a container, and/or a pod. In some examples, all of the resources 106 may be either virtual machines (VMs), containers, or pods. In certain examples, while some of the resources 106 may be VMs, some of the resources 106 may be containers, and some of the resources 106 may be pods.

As will be understood, a resource such as a VM may be an instance of an operating system hosted on a given host node via a VM host programs such as a hypervisor. Further, a resource such as a container may be a packaged application with its dependencies (e.g., operating system resources, processing allocations, memory allocations, etc.) hosted on a given host node via a container host program such as a container runtime (e.g., Docker Engine), for example. Further, in some examples, certain number of containers may be grouped to form a pod. For example, a set of containers that are associated with a common application may be grouped to form a pod.

The resources 106 may be deployed on the respective host nodes to execute one or more applications or services. In an example, the resources 106 may execute separate applications on their respective host nodes 102. In some examples, two or more of the resources 106 may execute one or more applications by partially executing each of the applications on the respective host nodes 102. That is, the resources 106 may execute the application(s) across the respective host nodes 102.

Furthermore, the networked system 100 may include a resource management system 110 that manages deployment of the resources 106 on the respective host nodes 102 for executing the application(s) in the cluster 104. The resource management system 110 and the host nodes 102 may be coupled via a network 112.

Examples of the network 112 may include, but are not limited to, an Internet Protocol (IP) or non-IP-based local area network (LAN), wireless LAN (WLAN), metropolitan area network (MAN), wide area network (WAN), storage area network (SAN), personal area network (PAN), cellular communication network, Public Switched Telephone Network (PSTN), and the Internet. Communication over the network 112 may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the network 112 may be enabled via a wired (e.g., copper, optical communication, etc.) or a wireless (e.g., Wi-Fi®, cellular communication, satellite communication, Bluetooth, etc.) communication technology. In some examples, the network 112 may be enabled via private communication links including, but are not limited to, communication links established via Bluetooth, cellular communication, optical communication, radio frequency communication, wired (e.g., copper), and the like. In some examples, the private communication links may be direct communication links between the resource management system 110 and the host nodes 102.

The resource management system 110 may include any combination of hardware and programming to implement the functionalities of the resource management system 110 as described herein. In an example, the resource management system 110 may be implemented as a program of instructions that may be read by and executed on a processing circuitry, which may include one or more processors and one or more dedicated hardware, to perform various functionalities described herein. In this context, "processor" refers to any circuitry capable of executing machine-readable instructions, such as a central processing unit (CPU), a microprocessor, a microcontroller device, a digital signal processor (DSP), etc.

In examples in which the processing circuitry includes the processor(s) that are to execute machine-readable instructions, the machine-readable instructions may be stored in a memory. Memory may be a non-transitory, machine-readable medium including instructions that, when executed by the processor(s), cause the resource management system 110 to undertake certain actions.

The resource management system 110 may be included in a computing system such as a desktop computer, a laptop, a smartphone, a server, a computer appliance, a workstation, a storage system, or a converged or hyperconverged system, and the like. Further, in certain examples, the resource management system 110 may be a virtual machine or a containerized application executing on a hardware in the networked system 100.

In an example, the resource management system 110 may include a resource orchestrator 114, a scheduler 116, a taint monitoring system 118 and a database 120. The resource orchestrator 114 may manage the deployment of the resources 106 on the respective host nodes 102 and monitor the resources 106 deployed in the cluster 104 or across various clusters that are managed by the resource management system 112. The resource orchestrator 114 may communicate with other components (e.g., the scheduler 116 and the taint monitoring system 118) of the resource management system 100 using an API (Application Programming Interface) interface such as REST (representational state transfer) API, SOAP (simple object access protocol) and the like.

The scheduler 116 may implement the resources 106 on the respective host nodes 102. As discussed previously, implementing a resource on a host node for executing an application or a service may be referred to as scheduling the resource on the host node. The scheduler 116 may schedule the resources 106 on the respective host nodes 102 based on the availability and scheduling policies of each of the resources and/or host nodes.

Any functionality described herein as performed by a component (e.g., the resource orchestrator 114, the scheduler 116 or the taint monitoring system 118) of the resource management system 110 may be performed by at least a processor executing instructions (stored on a machine-readable medium) to perform the functionalities as described herein.

In certain examples, the resource orchestrator 114 may monitor each host node 102 to determine whether the host node 102 is serviceable based on one or more predefined parameters such as power state, network connectivity state, I/O threshold, and the like. In some examples, when the resources 106 are pods, the resource orchestrator 114 may be a container orchestrator such as Kubernetes, for example. Further, in the networked system 100, if the resources 106 are pods, the host nodes 102 may be referred to as worker nodes and the cluster 104 may be referred to as Kubernetes clusters, in some examples.

In certain examples, the resource orchestrator 114 may monitor each host node 102 to determine whether the host node fulfils all the predefined parameters depending on data received related to the performance of the host node. In an example, when a host node (e.g., the host node 102-1) fails to fulfil one or more of the predefined parameters, the resource orchestrator 114 may determine that the host node 102-1 is not serviceable. In these instances, the resource orchestrator 114 may apply a taint on the host node 102-1 (i.e., the host node 102-1 is tainted) and automatically make the host node 102-1 offline and unschedulable. Further, the resource orchestrator 114 may continue monitoring the host node 102-1. In some examples, the resource orchestrator 114 may determine that the host node 102-1 is again serviceable, that is the host node 102-1 fulfils all the predefined parameters again. In these examples, the resource orchestrator 114 may remove the taint (i.e., the host node 102-1 is non-tainted) from the host node 102-1 and may automatically make the host node 102-1 online and schedulable.

As used herein, the term "apply a taint on a host node" or "taint a host node" may mean marking the host node so that no resource can be scheduled or executed on the host node. A taint is an attribute maintained as metadata at a resource orchestrator (e.g., the resource orchestrator 114) or a key value store for the resource orchestrator. In an example, a taint is a key value store including an effect. For example, a format of the taint is <key>=<value>:<effect>. On applying the taint on a host node, the effect, via the resource orchestrator, instructs a scheduler (e.g., the scheduler 116) what should happen to a resource that is already scheduled on that host node or another resource that is to be scheduled on the host node. For example, the effect may include 'NoSchedule' that instructs, via the resource orchestrator, the scheduler not to schedule a resource that is not yet scheduled on the host node and 'NoExecute' that instructs, via the resource orchestrator, the scheduler not to execute the resource(s) that are already scheduled on the host node. In an example, 'NoExecute' may instruct the scheduler to evict the resource(s) that are already scheduled on the host node. Further, any instruction from the effect, as described herein, may be considered to be provided by the resource orchestrator.

In some examples, when a host node (e.g., the host node 102-1) is tainted, the resource orchestrator 114 instructs the scheduler 116 not to schedule or execute any resource 106-1 on the host node 102-1. In certain examples, the resource orchestrator 114 instructs the scheduler 116 not to schedule any of the resource 106-1, that is to be scheduled, on the host node 102-1 and evict the resource(s) 106-1, that are already scheduled on the host node 102-1, from the host node 102-1. In some examples, when the taint is removed from the host node 102-1 and the host node 102-1 is non-tainted again, the scheduler 116 may schedule the resource(s) 106-1 on the host node 102-1.

During the operation, a host node (e.g., the host node 102-1) may be serviceable and non-serviceable frequently due to, for example, network connectivity issues. In such instances, the resource orchestrator 114 may make the host node 102-1 tainted and non-tainted frequently.

The taint monitoring system 118 may comprise a processor-based system, device or apparatus that may enable the functionalities of the taint monitoring system 118, as described herein. The taint monitoring system 118 may instead be a service or application executing on a processor-based system. In an example, the taint monitoring system 118 may be implemented as a program of instructions that may be read by and executed on a processor of the resource management system 110, and the processor executing the instructions may serve as or form part of the taint monitoring system 118.

In the examples described herein, the taint monitoring system 118 may track a taint status of each of the host nodes 102 and identify whether any host node of the host nodes 102 is inconsistent based on the taint status of the host nodes 102 over a predefined period of time. In some examples, to determine if any of the host nodes 102 are inconsistent, the taint monitoring system 118 may periodically receive the taint status of each of the host nodes 102 from the resource orchestrator 114 and store the received taint status of each of the host nodes 102 in a database 120. The database 120 may be included in the memory of the resource management system 100. In the examples as described herein, the taint monitoring system 118 may periodically receive the taint status of each of the host nodes 102 in a time interval that may be 5 minutes, 10 minutes, 20 minutes, etc. In an example, the resource orchestrator 114 sends the taint status of each of the host nodes 102 to the taint monitoring system 118 on a real-time basis. The taint monitoring system 118 may continue receiving the taint status of each of the host nodes 102 from the resource orchestrator 114 and continue storing the received taint status of each of the host nodes 102 in the database 120.

In order to track the taint status of each host node 102, the taint monitoring system 118 may retrieve information including the taint status of each of the host nodes 102 from the database 120 and monitor the retrieved taint status of each of the host nodes 102 over the predefined period of time. The predefined period of time may be in minutes or hours. Examples of the predefined period of time may be 30 minutes, one hour, or two hours. In particular, the taint monitoring system 118 continuously retrieves the information from the database 120 on a real-time basis, and monitors the taint status of each of the host nodes 102 over the predefined period of time. In some implementations, monitoring of the taint status may be performed as a sliding or moving window having a width equal to the predefined period of time. In some implementations, monitoring may be performed using non-overlapping windows. In FIG. 2, Table 1 shows example taint status (column 206) of the host nodes 102 (column 202), retrieved from the database 120, over the last five hours from a point in time. In column 206, the taint status of the host nodes 102 is shown by denoting the taint status "tainted" as "0" and "non-tainted" as "1." In this example, the taint monitoring system 118 continuously retrieves the information from the database 120 and monitors the retrieved taint status of each of the host nodes 102 using, for example, a one hour moving window.

While monitoring the taint status, the taint monitoring system 118 may identify whether any host node out of the host nodes 102 demonstrates an inconsistent behavior based on the taint status of the host node. That is, the taint monitoring system 118 may identify whether any host node out of the host nodes 102 is inconsistent. For identifying an inconsistent host node from the host nodes 102, the taint monitoring system 118 may determine, for each of the host nodes 102, whether the taint status has fluctuated in a first preconfigured manner.

A first preconfigured manner, as used herein, defines a first predetermined number of fluctuations in a taint status of a host node in the predefined period of time defined by an administrator (e.g., a user). As used herein, the term "fluctuation" may refer to a single occurrence of a change in a taint status of a host node. In particular, a fluctuation may be an occurrence of a change from tainted to non-tainted or vice versa (e.g., '0' to '1' or '1' to '0' in FIG. 2).

The first predetermined number of fluctuations in the predefined period of time may be referred to as a first threshold. In an example, the first threshold may be five fluctuations in an hour or three fluctuations in 30 minutes. When a number of fluctuations in a taint status, for a given host node, is less than or equal to the first threshold, it may be determined that the taint status of the given host node has fluctuated in the first preconfigured manner. When a number fluctuations in the taint status, for the given host node, is more than the first threshold, it may be determined that the taint status of the given host node has fluctuated beyond the first preconfigured manner.

In some examples, the taint monitoring system 118 may determine that the taint status of one of the host nodes 102 (e.g., the host node 102-1) has fluctuated beyond the first preconfigured manner. For example, the taint status of the host node 102-1 has fluctuated a number of times more than the first threshold (i.e., the first predetermined number of fluctuations in the predefined period of time). In such examples, the host node 102-1 shows an inconsistent behavior, and the host node 102-1 is determined to be inconsistent. In this way, the taint monitoring system 118 identifies that the host node 102-1 is inconsistent. In some examples, the taint monitoring system 118 may identify one or more inconsistent host nodes out of the host nodes 102.

In response to determining that the host node 102-1 is inconsistent, the taint monitoring system 118 may instruct the resource orchestrator 114 to apply a master taint on the host node 102-1. A master taint may be a taint, when applied on a given host node, prevents scheduling or executing a resource on the given host node until the master taint is removed. The master taint overrides any other taint applied on the given host node. That is, even if the given host node is non-tainted, the master taint, if applied on the given host node, would prevent scheduling or executing a resource on the given host node. In an example, an effect of the master taint is 'NoSchedule' and 'NoExecute.' In some examples, on applying a master taint on the host node 102-1, the effect, via the resource orchestrator 114, instructs the scheduler 116 not to schedule or execute any resource 106-1 on the host node 102-1. Any instruction from the effect, as described herein, may be considered to be provided by the resource orchestrator 114.

In the examples described herein, in response to the instructions from the taint monitoring system 118, the resource orchestrator 114 may apply the master taint on the host node 102-1. The resource orchestrator 114 applies the master taint on the host node 102-1 in addition to the taint status. Upon applying the master taint on the host node 102-1, the resource orchestrator 114 instructs the scheduler 116 not to schedule or execute any resource 106-1 on the host node 102-1. In certain examples, the resource orchestrator 114 instructs the scheduler 116 not to schedule any of the resource 106-1, that is to be scheduled, on the host node 102-1 and evict the resource(s) 106-1, that are already scheduled on the host node 102-1, from the host node 102-1. As per the instructions, the scheduler 116 does not schedule any of the resource(s) 106-1, that is to be scheduled on the host node 102-1, and does not execute the resource(s) 106-1 that are already scheduled on the host node 102-1. In an example, the scheduler 116 evicts the resource(s) 106-1 that are already scheduled on the host node 102-1. The application of the master taint may continue until the host node 102-1 shows consistent behavior again.

Table 1, in FIG. 2, shows example taint status (column 206) of the host nodes 102 (column 202) over the last 5 hours from a point in time that has been retrieved from the database 120. In column 206, by monitoring the taint status using, for example, a one hour window (e.g., a moving window), it can be observed that the taint status of the host node 102-1 has fluctuated frequently (i.e., five times) in the last one hour. Further, it can be determined that the host node 102-1 has fluctuated more than the first threshold (e.g., three fluctuations in one hour) in the last one hour. In other words, the taint status of the host node 102-1 has fluctuated beyond the first preconfigured manner. Accordingly, it is identified that the host node 102-1 shows inconsistent behavior. Therefore, a master taint 'M' (in column 206) with the effect 'NoSchedule' and 'NoExecute' (column 204) is applied on the host node 102-1, as shown in Table 1.

Further, the taint monitoring system 118 may continue tracking the taint status of each of the host nodes 102. That is, the taint monitoring system 118 may continue tracking the taint status of the host node 102-1 after applying the master taint on the host node 102-1. The taint monitoring system 118 may continue retrieve the taint status of each of the host nodes 102 (including the host node 102-1) from the database 120 and monitor the retrieved taint status of each of the host nodes 102 over the predefined period of time.

In some examples, while tracking the taint status, the taint monitoring system 118 may determine whether the taint status of the host node 102-1 has fluctuated in a second preconfigured manner. A second preconfigured manner, as used herein, defines a second predetermined number of fluctuations in a taint status of a host node in the predefined period of time defined by an administrator (e.g., a user). This second predetermined number of fluctuations may be referred to as a second threshold. The second threshold may be the same or different from the first threshold. For example, the second threshold may be four fluctuations in an hour or two fluctuations in an hour. When a number of fluctuations in a taint status, for a given host node, is less than or equal to the second threshold, it may be determined that the taint status of the given host node has fluctuated in the second preconfigured manner. When a number of fluctuations from in the taint status, for the given host node, is more than the second threshold, it may be determined that the taint status of the given host node has fluctuated beyond the second preconfigured manner.

In some examples, the taint monitoring system 118 determines that the taint status of the host node 102-1 has fluctuated in the second preconfigured manner. In these examples, the taint monitoring system 118 identifies that the host node 102-1 is consistent. In some examples, in order to determine whether the host node 102-1 is consistent, it may be determined whether the taint status of the host node 102-1 remained non-tainted over the predefined period of time.

Upon determining that the taint status of the host node 102-1 has fluctuated in the second preconfigured manner (i.e., the host node 102-1 is consistent), the taint monitoring system 118 may instruct the resource orchestrator 114 to remove the master taint from the host node 102-1. In response, the resource orchestrator 114 may remove the master taint from the host node 102-1. On removal of the master taint, the scheduler 116 may schedule the resource(s) 106-1 on the host node 102-1.

Table 2, in FIG. 2, shows example taint status (column 216) of the host nodes 102 (column 202) for next two hours in continuation of the five hours shown in Table 1, after the application of the master taint 'M' on the host node 102-1. The application of the master taint 'M' continues until the master taint 'M' is removed. It can be observed, in column 216, that the master taint 'M' continues for next two hours after applying the master taint 'M' on the host node 102-1. While tracking, it is observed that the taint status of the host node 102-1 is consistently non-tainted for the last one hour. Based on the taint status in column 216, it can be determined that the taint status of the host node 102-1 has fluctuated in the second preconfigured manner and hence the host node 102-1 shows consistent behavior. As the host node 102-1 is consistent again, the master taint 'M' is removed from the host node 120-1, as shown in columns 204 and 216.

Further, it may be noted that each of Tables 1 and 2, in FIG. 2, represents an example portion of data for illustration purposes. The database 120 may store additional data related to various other host nodes.

In other examples, the taint monitoring system 118 determines that the taint status of the host node 102-1 has fluctuated beyond the second preconfigured manner. In these examples, the taint monitoring system 118 may identify that the host node 102-1 still shows the inconsistent behavior. In such examples, the taint monitoring system 118 may continue the application of the master taint on the host node 102-1 until it is determined that the host node 102-1 has fluctuated in the second preconfigured manner.

As will be appreciated, the methods and systems, as described herein, may help in preventing or avoiding frequent rescheduling of resources (e.g., the resources 106-1) on the inconsistent host nodes (e.g., the host node 102-1) due to any issues (e.g., the network connectivity issues) and thereby, improve the overall performance of the application(s) executed by the resources. In addition, the methods and systems provide some insights about any intermittent issue on a host node, that might have caused the host node to be inconsistent. These insights may be useful for the administrator to solve the issue.

Figure 3:
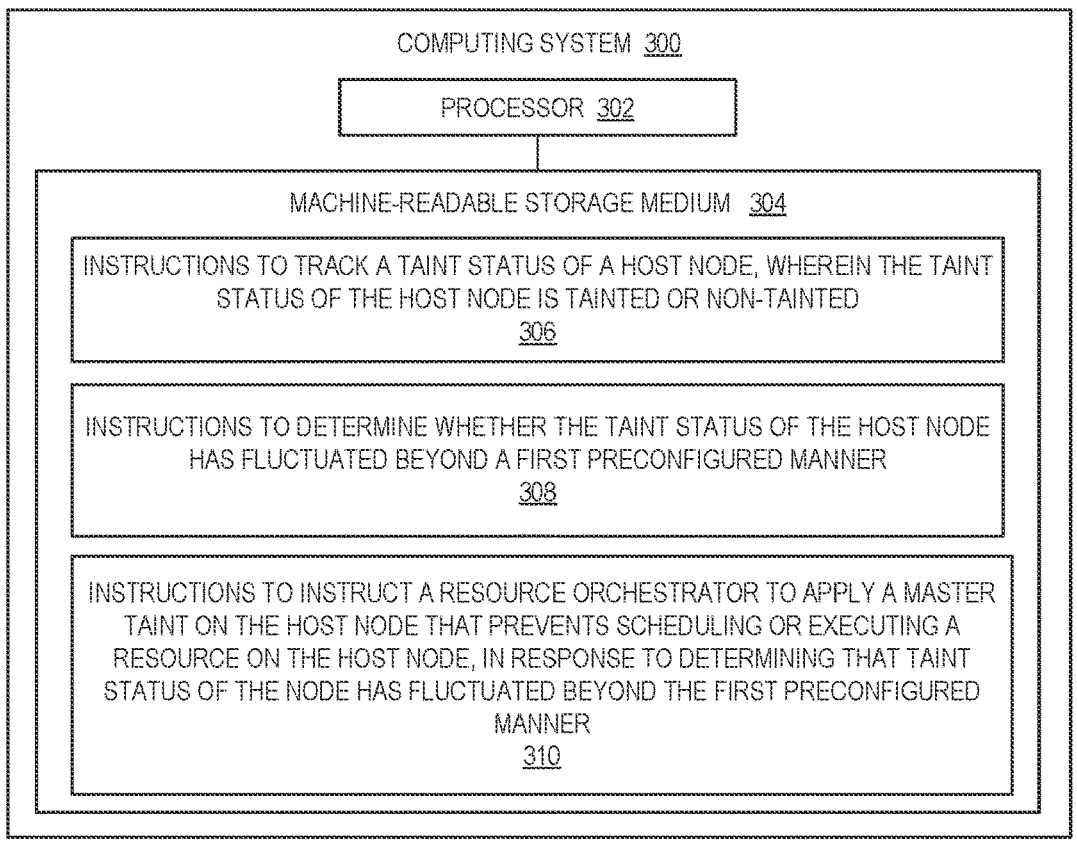
FIG. 3 is an example computing system including a processor and a machine-readable medium encoded with example instructions to apply a master taint on a host node in a networked system.

FIG. 3 is a block diagram 300 of a computing system 300 including a processor 302 and a machine-readable storage medium 304 encoded with example instructions 306, 308, and 310 (306-310) to prevent scheduling or executing a resource on an inconsistent host node in a networked system (e.g., the networked system 100 of FIG. 1), in accordance with an example. The instructions 306-310 of FIG. 3, when executed by the processor 302, may implement some or all functions of a taint monitoring system (e.g., the taint monitoring system 118 of FIG. 1) to prevent scheduling or executing a resource on an inconsistent host node in a networked system. In some examples, the computing system 300 may be included in (e.g., as part of) the taint monitoring system 118 of FIG. 1.

For ease of illustration, FIG. 3 is described with reference to FIG. 1. In certain examples, the instructions 306-310 may be executed for performing the functionalities of the taint monitoring system 118 and one or more methods, such as, the methods 400 and 500 described below with respect to FIGS. 4 and 5. In certain examples, as an alternative or in addition to executing the instructions 306-310, the processor 302 may include at least one integrated circuit, other control logic, other electronic circuitry, or combinations thereof that include a number of electronic components for performing the functionalities described herein as being performed by the taint monitoring system 118.

Instructions 306, when executed by the processor 302, may track a taint status of a host node 102-1. The taint status of the host node 102-1 may be tainted or non-tainted at a point in time, as described above. In an example, the instructions 306 include instructions that, when executed by the processor 302, may periodically receive the taint status of the host node 102-1, store the received taint status in the database 120, retrieve the taint status of the host node 102-1 from the database 120, and monitor the retrieved taint status over the predefined period of time.

Instructions 308, when executed by the processor 302, may determine whether the taint status of the host node 102-1 has fluctuated beyond the first preconfigured manner (as described above). In some examples, if it is determined that the taint status of the host node 102-1 has not fluctuated beyond the first preconfigured manner, the host node is deemed consistent. In some other examples, it may be determined that the taint status of the host node 102-1 has fluctuated beyond the first preconfigured manner, in which case, the host node 102-1 is deemed inconsistent.

Upon identifying that the host node 102-1 is inconsistent, instructions 310, when executed by the processor 302, may instruct the resource orchestrator 114 to apply a master taint on the host node 102-1 that prevents scheduling or executing the resource(s) 106-1 on the host node 102-1.

The instructions 306-310 may include various instructions to execute at least a part of the methods described in FIGS. 4, 5, and 6 (described later). Also, although not shown in FIG. 3, the machine-readable storage medium 304 may also include additional program instructions to perform various other method blocks described in FIGS. 4, 5, and 6.

Figure 4:
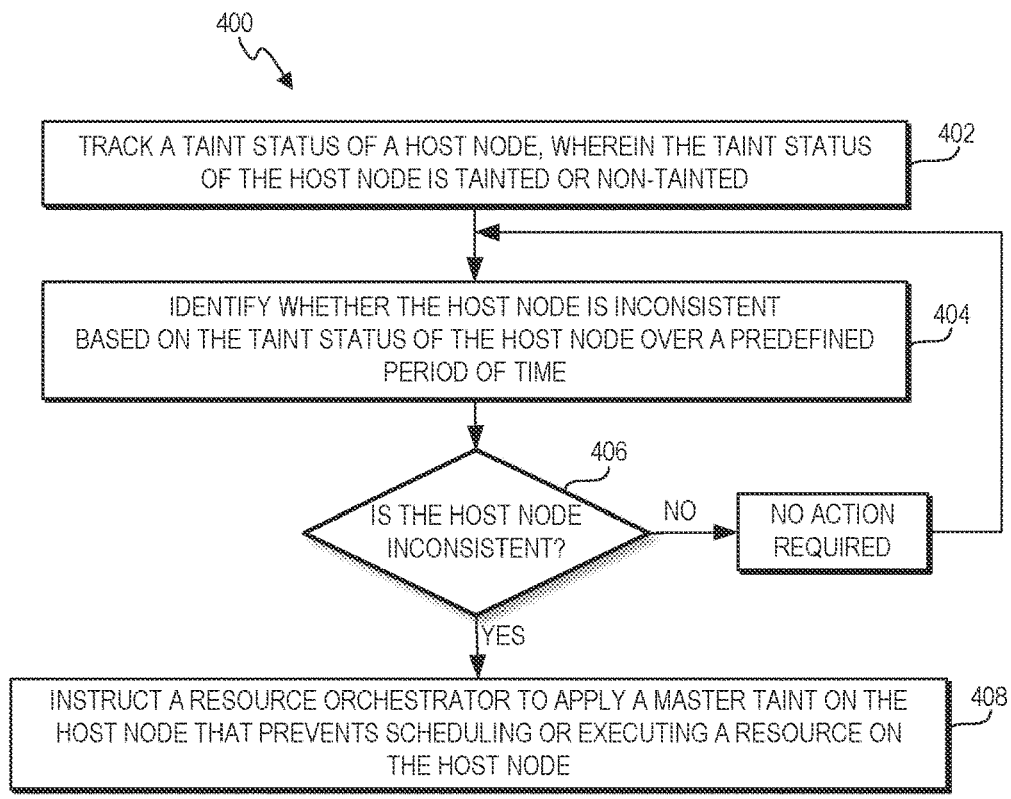
FIG. 4 is a flow diagram of an example method including identifying that a host node is inconsistent and applying a master taint on the host node.
Figure 5:
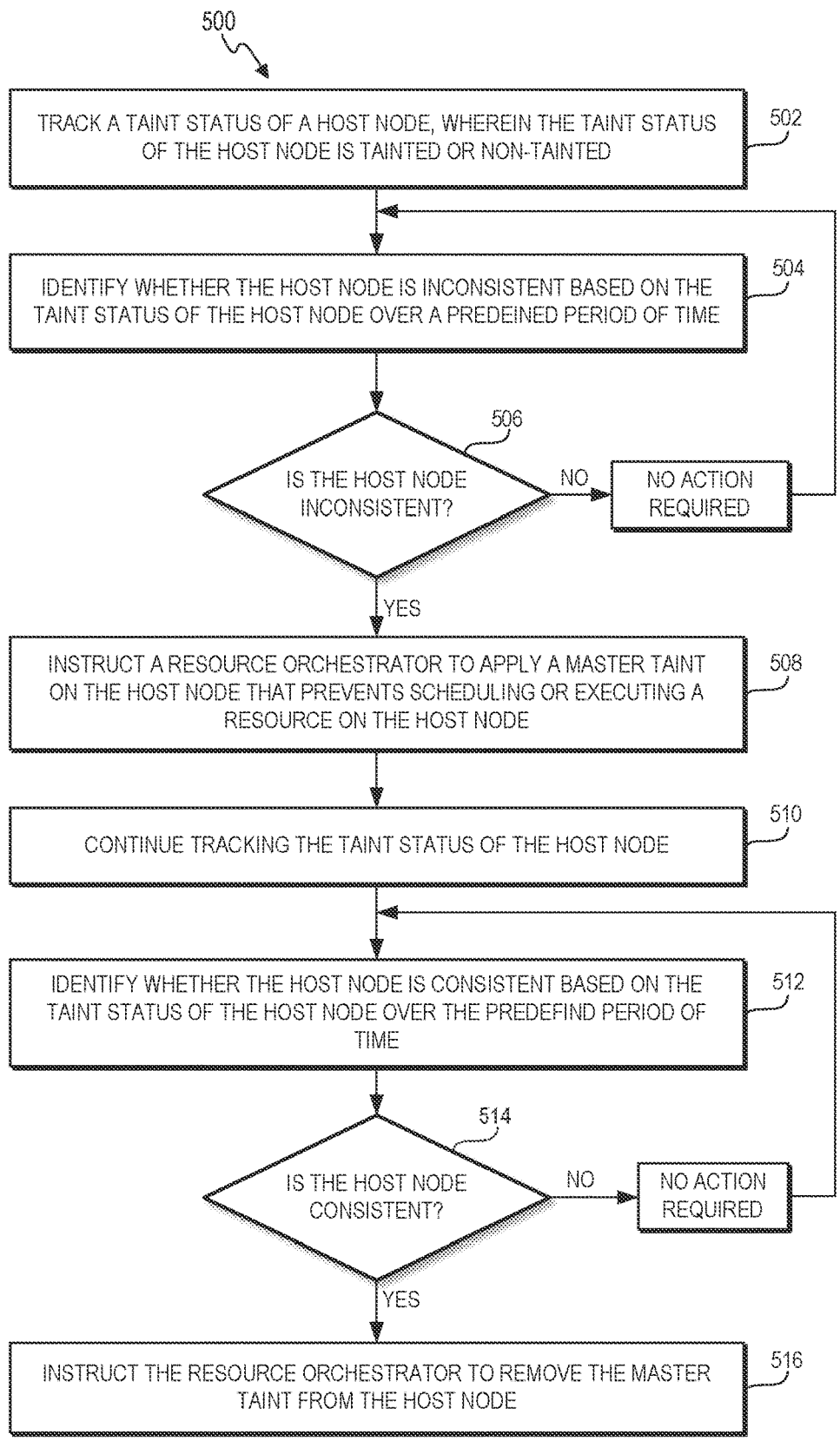
FIG. 5 is a flow diagram of a method including applying and removing a master taint on a host node in a networked system, in accordance with an example.
Figure 6:
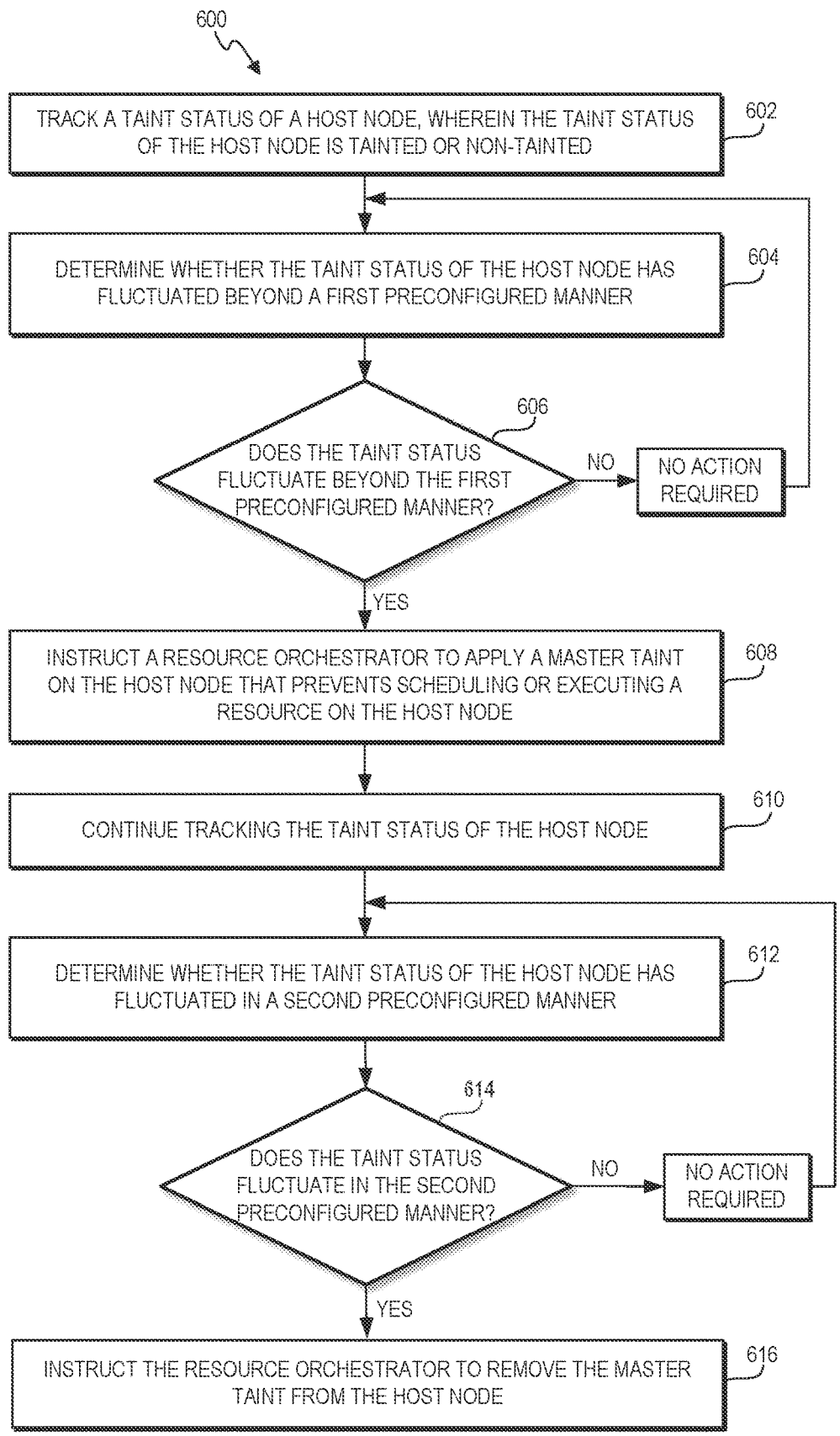
FIG. 6 is a flow diagram of a method for applying and removing a master taint on a host node in a networked system, in accordance with another example.

FIGS. 4, 5, and 6 depict flowcharts of example methods 400, 500, and 600 for preventing scheduling or executing a resource on an inconsistent host node in a networked system (e.g., the networked system 100 of FIG. 1). For illustration purposes, the execution of example methods 400, 500, and 600 is described in conjunction with the networked system 100 of FIG. 1. Although the below description is described with reference to the taint monitoring system 118 of FIG. 1, other applications or devices suitable for the execution of methods 400, 500, and 600 may be utilized. In some examples, the methods 400, 500, and 600, individually, at each method blocks may be executed by the computing system 300 (FIG. 3) via the processor 302 that executes the instructions 306-312 stored in the non-transitory machine-readable storage medium 304, and the processor 302 executing instructions 306-312 may serve as or form part of the taint monitoring system 118. Additionally, implementation of methods 400, 500, and 600 is not limited to such examples. Although the flowcharts of FIGS. 4, 5, and 6, individually, show a specific order of performance of certain functionalities, methods 400, 500, and 600 are not limited to such order. For example, the functionalities shown in succession in the flowcharts may be performed in a different order, may be executed concurrently or with partial concurrence, or a combination thereof.

Referring to FIG. 4, in block 402, the taint monitoring system 118 may track a taint status of a host node (e.g., the host node 102-1). The taint status of the host node 102-1 may be tainted or non-tainted at a point in time, as described above. In an example, the taint monitoring system 118 may periodically receive the taint status of the host node 102-1 from the resource orchestrator 114 and store the received taint status in the database 120. In order to track the taint status of the host node 102-1, the taint monitoring system 118 may retrieve the taint status of the host node 102-1 from the database 120 and monitor the retrieved taint status over the predefined period of time.

In block 404, the taint monitoring system 118 may identify whether the host node 102-1 is inconsistent based on the tracked taint status of the host node 102-1. In some examples, the taint monitoring system 118 may identify whether the host node 102-1 is inconsistent by monitoring the retrieved taint status of the host node 102-1 over the predefined period of time. While monitoring, it may be determined whether the taint status of the host node 102-1 has fluctuated beyond the first preconfigured manner (as described above). In order to determine that the taint status of the host node 102-1 has fluctuated beyond the first preconfigured manner, it may be determined whether a number of fluctuations, in the taint status, in the predefined period of time is more than the first threshold (i.e., the first predetermined number of fluctuations in the predefined period of time).

In some examples, it may be determined that the number of fluctuations in the predefined period of time is more than the first threshold. That is, the taint status of the host node 102-1 has fluctuated beyond the first preconfigured manner. In these examples, the taint monitoring system 118 may identify that the host node 102-1 is inconsistent ('YES' in block 406). The method may then proceed to block 408.

In other examples, it may be determined that the number of fluctuations in the predefined period of time is less than or equal to the first threshold (i.e., the first predetermined number of fluctuations in the predefined period of time). That is, the taint status of the host node 102-1 has fluctuated in the first preconfigured manner. In these examples, the taint monitoring system 118 may identify that the host node 102-1 is consistent ('NO' in block 406). In such instances, no action is required.

In block 408, the taint monitoring system 118 may, in response to identifying that the host node 102-1 is inconsistent, instruct the resource orchestrator 114 to apply a master taint on the host node 102-1. As described in the examples herein, the master taint prevents scheduling and executing the resource(s) 106-1 on the host node 102-1. In certain examples, on applying the master taint on the host node 102-1, the scheduler 116 does not schedule the resource(s) 106-1, that are to be scheduled, on the host node 102-1 and evict the resource(s) 106-1, that are already scheduled, from the host node 102-1. Additional details of identifying inconsistent host nodes and preventing scheduling or executing resources on the host nodes are described with respect to FIGS. 1 and 2.

Turning now to FIG. 5, the method 500 includes certain blocks that are similar to one or more blocks described in FIG. 4, details of which are not repeated herein for the sake of brevity. By way of example, the blocks 502, 504, 506, and 508 of FIG. 5 are similar to blocks 402, 404, 406, and 408, respectively, of FIG. 4.

In block 502, the taint monitoring system 118 may track the taint status of the host node 102-1. In block 504, the taint monitoring system 118 may identify whether the host node 102-1 is inconsistent based on the tracked taint status of the host node 102-1. In some examples, the taint monitoring system 118 may identify that the host node 102-1 is inconsistent ('YES' in block 506). The method may then proceed to block 508. In other examples, the taint monitoring system 118 may identify that the host node 102-1 is consistent ('NO' in block 506). In such instances, no action is required. In block 508, the taint monitoring system 118 may, in response to identifying that the host node 102-1 is inconsistent, instruct the resource orchestrator 114 to apply a master taint on the host node 102-1. On applying the master taint on the host node 102-1, the scheduler 116 does not schedule the resource(s) 106-1, that are to be scheduled, on the host node 102-1 and evict the resource(s) 106-1, that are already scheduled, from the host node 102-1.

In block 510, the taint monitoring system 118 may continue tracking the taint status of the host node 102-1. In the examples described herein, the taint monitoring system 118 may continue tracking the taint status of the host node 102-1 after applying the master taint on the host node 102-1. The taint status of the host node 102-1 may be tracked in the same way as described at block 502.

In block 512, the taint monitoring system 118 may identify whether the host node 102-1 is consistent based on the tracked taint status of the host node 102-1 over the predefined period of time. In the examples described herein, the taint monitoring system 118 may identify whether the host node 102-1 is consistent based on the retrieved taint status of the host node 102-1 over the predefined period of time. In some examples, it may be determined whether the taint status of the host node 102-1 has fluctuated in the second preconfigured manner (described above). In order to determine that the taint status of the host node 102-1 has fluctuated in the second preconfigured manner, it may be determined whether a number of fluctuations in the predefined period of time is up to the second threshold (i.e., the second predetermined number of fluctuations in the predefined period of time).

In some examples, it may be determined that the number of fluctuations in the predefined period of time is less than the second threshold. That is, the taint status of the host node 102-1 has fluctuated in the second preconfigured manner. In these examples, the taint monitoring system 118 may identify that the host node 102-1 is consistent ('YES' in block 514). The method may then proceed to block 516.

In other examples, it may be determined that the number of fluctuations in the predefined period of time is more than the second threshold. That is, the taint status of the host node 102-1 has fluctuated beyond the second preconfigured manner. In these examples, the taint monitoring system 118 may identify that the host node 102-1 is inconsistent ('NO' in block 514). In such instances, no action is required. The resource orchestrator 114 may continue the application of the master taint on the host node 102-1.

In block 516, the taint monitoring system 118 may, in response to identifying that the host node 102-1 is consistent, instruct the resource orchestrator 114 to remove the master taint from the host node 102-1. On removal of the master taint, the scheduler 116 can schedule the resource(s) 106-1 on the host node 102-1.

Turning now to FIG. 6, the method 600 includes certain blocks that are similar to one or more blocks described in FIG. 5, details of which are not repeated herein for the sake of brevity. By way of example, the blocks 602, 608, 610, and 616 of FIG. 6 are similar to blocks 502, 508, 510, and 516, respectively, of FIG. 5.

In block 602, the taint monitoring system 118 may track the taint status of the host node 102-1. In block 604, the taint monitoring system 118 may determine whether the taint status of the host node 102-1 has fluctuated beyond the first preconfigured manner. In order to determine that the taint status of the host node 102-1 has fluctuated beyond the first preconfigured manner, it may be determined whether a number of fluctuations, in the taint status, in the predefined period of time is more than the first threshold (i.e., the first predetermined number of fluctuations in the predefined period of time).

In some examples, the taint monitoring system 118 may determine that the taint status of the host node 102-1 has fluctuated beyond the first preconfigured manner (YES' in block 606). The method 600 may then proceed to block 608. In other examples, the taint monitoring system 118 may determine that the taint status of the host node 102-1 has fluctuated in the first preconfigured manner ('NO' in block 606). In such instances, no action is required. In block 608, the taint monitoring system 118 may instruct the resource orchestrator 114 to apply a master taint on the host node 102-1. On applying the master taint on the host node 102-1, the scheduler 116 does not schedule the resource(s) 106-1, that are to be scheduled, on the host node 102-1 and evict the resource(s) 106-1, that are already scheduled, from the host node 102-1.

In block 610, the taint monitoring system 118 may continue tracking the taint status of the host node 102-1. In the examples described herein, the taint monitoring system 118 may continue tracking the taint status of the host node 102-1 after applying the master taint on the host node 102-1. The taint status of the host node 102-1 may be tracked in the same way as described in block 602.

In block 612, the taint monitoring system 118 may determine whether the taint status of the host node 102-1 has fluctuated in the second preconfigured manner (described above). In order to determine that the taint status of the host node 102-1 has fluctuated in the second preconfigured manner, it may be determined whether a number of fluctuations in the predefined period of time is up to the second threshold (i.e., the second predetermined number of fluctuations in the predefined period of time).

In some examples, it may be determined that the number of fluctuations in the predefined period of time is more than the second threshold. That is, the taint status of the host node 102-1 has fluctuated beyond the second preconfigured manner ('NO' in block 614). In such instances, no action is required. The resource orchestrator 114 may continue the application of the master taint on the host node 102-1.

In some examples, it may be determined that the number of fluctuations in the predefined period of time is less than the second threshold. That is, the taint status of the host node 102-1 has fluctuated in the second preconfigured manner (YES' in block 614). The method may then proceed to block 616.

In block 616, the taint monitoring system 118 may instruct the resource orchestrator 114 to remove the master taint from the host node 102-1. On removal of the master taint, the scheduler 116 can schedule the resources 106-1 on the host node 102-1.

In examples described herein, functionalities described as being performed by "instructions" may be understood as functionalities that may be performed by those instructions when executed by a processor. In other examples, functionalities described in relation to instructions may be implemented by one or more systems or components, which may be any combination of hardware and programming to implement the functionalities of the system(s) or component(s).

As used herein, a "computing system" may be a server, storage device, storage array, desktop or laptop computer, switch, router, or any other processing device or equipment including a processor. In examples described herein, a processor may refer to one processor or multiple processors included in a single computing device or distributed across multiple computing systems. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processor may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing system executing the machine-readable instructions, or remote from but accessible to the computing system (e.g., via a computer network) for execution. In the examples illustrated in FIG. 1, the taint monitoring system 118 may be implemented by one machine-readable storage medium, or multiple machine-readable storage media.

As used herein, a "machine-readable medium" may be any electronic, magnetic, optical, or other physical storage apparatus to contain or store information such as executable instructions, data, and the like. For example, any machine-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). All of the features disclosed in this specification (including any accompanying claims, abstract and drawings), and/or all of the elements of any method or process so disclosed, may be combined in any combination, except combinations where at least some of such features and/or elements are mutually exclusive.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

We claim:

1. A resource management system of a networked system, comprising:
   a resource orchestrator to apply and remove a taint on and from the host node coupled to the resource management system, wherein the host node possesses a taint status that is tainted or non-tainted; and
   a taint monitoring system comprising a processor and a non-transitory, machine-readable medium storing instructions that, when executed by the processor, cause the processor to:
   track the taint status of the host node,
   identify that the host node is inconsistent based on the taint status of the host node over a predefined period of time,
   in response to identifying that the host node is inconsistent, instruct the resource orchestrator to apply a master taint on the host node that prevents scheduling or executing a resource on the host node,
   continue tracking the taint status of the host node after applying the master taint on the host node,
   identify that the host node is consistent based on the taint status of the host node over the predefined period of time by determining whether the taint status of the host node has fluctuated in a second preconfigured manner, wherein the second preconfigured manner defines a second predetermined number of fluctuations in a taint status in the predefined period of time; and
   in response to identifying that the host node is consistent, instruct the resource orchestrator to remove the master taint from the host node.

2. The resource management system of claim 1, wherein the instructions to track comprise instructions, when executed by the processor, cause the processor to:
   periodically receive the taint status of the host node from the resource orchestrator;
   store the taint status of the host node in a database;
   retrieve the taint status of the host node from the database; and
   monitor the taint status of the host node, retrieved from the database, over the predefined period of time.

3. The resource management system of claim 1, wherein the instructions to identify whether the host node is inconsistent comprise instructions, when executed by the processor, cause the processor to: determine whether the taint status of the host node has fluctuated beyond a first preconfigured manner.

4. The resource management system of claim 3, wherein the first preconfigured manner defines a first predetermined number of fluctuations in a taint status in the predefined period of time.

5. The resource management system of claim 1, wherein the resource comprises a virtual machine, a container, or a pod.

6. A non-transitory machine-readable medium storing instructions that, when executed by a processor, cause the processor to:
   track a taint status of a host node, wherein the taint status of the host node is tainted or non-tainted;
   determine that the taint status of the host node has fluctuated beyond a first preconfigured manner over a predefined period of time;
   in response to determining that the taint status has fluctuated beyond the first preconfigured manner, instruct a resource orchestrator to apply a master taint on the host node that prevents scheduling or executing a resource on the host node;
   continue tracking the taint status of the host node after applying the master taint on the host node,
   identify that the host node is consistent based on the taint status of the host node over the predefined period of time by determining whether the taint status of the host node has fluctuated in a second preconfigured manner, wherein the second preconfigured manner defines a second predetermined number of fluctuations in a taint status in the predefined period of time; and
   in response to identifying that the host node is consistent, instruct the resource orchestrator to remove the master taint from the host node.

7. A method comprising:
   tracking, by a processor-based taint monitoring system, a taint status of a host node, wherein the taint status of the node is tainted or non-tainted;
   identifying, by the processor-based taint monitoring system, that the host node is inconsistent based on the taint status of the host node over a predefined period of time;
   in response to identifying that the host node is inconsistent, instructing, by the processor-based taint monitoring system, a resource orchestrator to apply a master taint on the host node that prevents scheduling or executing a resource on the host node;
   continue tracking the taint status of the host node after applying the master taint on the host node,
   identifying that the host node is consistent based on the taint status of the host node over the predefined period of time by determining whether the taint status of the host node has fluctuated in a second preconfigured manner, wherein the second preconfigured manner defines a second predetermined number of fluctuations in a taint status in the predefined period of time; and
   in response to identifying that the host node is consistent, instruct the resource orchestrator to remove the master taint from the host node.

8. The method of claim 7, wherein tracking the taint status of the host node comprises: periodically receiving the taint status of the host node from the resource orchestrator; storing the taint status of the host node in a database; retrieving the taint status of the host node from the database; and monitoring the taint status of the host node, retrieved from the database, over the predefined period of time.

9. The method of claim 7, wherein identifying whether the host node is inconsistent comprises determining whether the taint status of the host node has fluctuated beyond a first preconfigured manner.

10. The method of claim 9, wherein determining whether the taint status of the host node has fluctuated beyond the first preconfigured manner comprises: determining whether the taint status of the host node has fluctuated a number of times in the predefined period of time more than a first predetermined number of fluctuations in the predefined period of time.

11. The method of claim 7, wherein determining whether the taint status of the host node has fluctuated in the second preconfigured manner comprises determining whether the taint status of the node has remained non-tainted over the predefined period of time.

\* \* \* \* \*